US012290065B2

(12) United States Patent
Stoller

(10) Patent No.: US 12,290,065 B2
(45) Date of Patent: May 6, 2025

(54) SYSTEMS AND METHODS FOR IRRIGATING AGRICULTURAL FIELDS

(71) Applicant: Precision Planting LLC, Tremont, IL (US)

(72) Inventor: Jason J. Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 490 days.

(21) Appl. No.: 17/652,214

(22) Filed: Feb. 23, 2022

(65) Prior Publication Data

US 2022/0264860 A1 Aug. 25, 2022

Related U.S. Application Data

(60) Provisional application No. 63/153,127, filed on Feb. 24, 2021.

(51) Int. Cl.
*A01M 7/00* (2006.01)
*A01B 51/02* (2006.01)
*A01B 63/00* (2006.01)
*A01C 23/00* (2006.01)

(52) U.S. Cl.
CPC ......... *A01M 7/0085* (2013.01); *A01B 51/026* (2013.01); *A01B 63/006* (2013.01); *A01C 23/008* (2013.01); *A01M 7/0014* (2013.01)

(58) Field of Classification Search
CPC ... A01C 23/008; A01B 63/006; A01B 51/026; A01M 7/0085; A01M 7/0014; B60G 17/005; B60G 17/015; B60G 3/01; B60G 2300/08; B60G 2300/082; B60G 2300/083; B60G 2500/30; B60G 2204/46; B60G 2204/4604; B60G 2204/423; B60G 2204/4232
See application file for complete search history.

(56) References Cited

U.S. PATENT DOCUMENTS 3,683,547 A 8/1972 Harden
5,092,422 A 3/1992 Hood, Jr. et al.
(Continued)

FOREIGN PATENT DOCUMENTS

DE 102008041323 A1 2/2010
EP 3014983 A1 5/2016
(Continued)

OTHER PUBLICATIONS

UK Intellectual Property Office, Search Report for related UK Patent Application No. GB2114683.2, dated Dec. 10, 2021.
(Continued)

*Primary Examiner* — Christopher R Dandridge

(57) ABSTRACT

A system for irrigating an agricultural field includes a high-clearance vehicle (e.g., a sprayer vehicle) and a hose configured to connect an external water source to the high-clearance vehicle while the high-clearance vehicle traverses the agricultural field. A method for irrigating an agricultural field includes connecting an external water source to a high-clearance vehicle by a hose, and dispensing water from the nozzles of the high-clearance vehicle while the external water source remains connected thereto and while the high-clearance vehicle traverses the agricultural field.

20 Claims, 11 Drawing Sheets

(56) References Cited

U.S. PATENT DOCUMENTS

| | | | | |
|---|---|---|---|---|
| 5,842,307 | A * | 12/1998 | May | A01M 7/0089 |
| | | | | 47/1.7 |
| 6,199,769 | B1 | 3/2001 | Weddle | |
| 7,669,675 | B2 * | 3/2010 | Hagie | A01M 7/0042 |
| | | | | 180/22 |
| 8,042,817 | B2 * | 10/2011 | Motebennur | B60G 9/00 |
| | | | | 280/6.154 |
| 9,167,745 | B2 | 10/2015 | Muff | |
| 9,296,273 | B2 * | 3/2016 | Slawson | B60G 15/12 |
| 10,375,949 | B2 | 8/2019 | Snyder | |
| 10,556,476 | B2 * | 2/2020 | Dames | B60G 7/001 |
| 10,569,612 | B2 | 2/2020 | Bittner et al. | |
| 10,694,734 | B2 * | 6/2020 | Davis | G05D 1/0278 |
| 2015/0102568 | A1 | 4/2015 | Slawson | |
| 2019/0128864 | A1 | 5/2019 | Pickett et al. | |
| 2020/0163269 | A1 * | 5/2020 | Crowley | B60B 35/109 |

FOREIGN PATENT DOCUMENTS

| | | | | |
|---|---|---|---|---|
| JP | H11206253 A | 8/1999 | | |
| WO | WO-2020257456 A1 * | 12/2020 | | A01C 23/042 |

OTHER PUBLICATIONS

European Patent Office, International Search Report related to European Patent Application No. EP22154080.0, dated Jul. 25, 2022, 7 pages.

* cited by examiner

SYSTEMS AND METHODS FOR IRRIGATING AGRICULTURAL FIELDS

CROSS-REFERENCE TO RELATED APPLICATION

This application claims the benefit of the filing date of U.S. Provisional Patent Application 63/153,127, "Systems and Methods for Irrigating Agricultural Fields," filed Feb. 24, 2021, the entire disclosure of which is incorporated herein by reference.

FIELD

Embodiments of the present disclosure relate generally to systems and methods of irrigating agricultural fields.

BACKGROUND

Irrigation of agricultural fields is commonly performed with a center-pivot irrigation system. Such systems include a well or other water supply connected to a central pivot point. A long sprinkler arm, which may be in the form of pipe segments, is supported by wheels and trusses. One or more motors move the sprinkler arm around the pivot, and sprinklers attached to the sprinkler arm (e.g., hanging below the sprinkler arm) provide the water to crops growing in the field.

Center-pivot irrigation has certain drawbacks. Because of the way systems operate, square fields will have some area that cannot be efficiently irrigated by center-pivot irrigation. Some center-pivot irrigation systems include a corner sprinkler arm extending outward from the end of the sprinkler arm, which can cover portions of the corners. However, even with such modifications, a center-pivot irrigation system may not be used to its full potential (i.e., the sprinkler arm may pivot less than 360° around the pivot) in irregularly shaped fields. Furthermore, not all areas of the field may require the same amount of irrigation.

BRIEF SUMMARY

In some embodiments, a system for irrigating an agricultural field includes a high-clearance vehicle and a hose configured to connect an external water source to the high-clearance vehicle while the high-clearance vehicle traverses the agricultural field. The high-clearance vehicle has a first wheel support structure carrying a first wheel, a second wheel support structure carrying a second wheel, at least one axle connected at a first end to the first wheel support structure and at a second end to the second wheel support structure, a chassis supported by the at least one axle, an operator cab carried by the chassis, a liquid tank carried by the chassis, at least one boom carried by the chassis, a prime mover carried by the chassis and configured to drive rotation of the first wheel and the second wheel, a steering system configured to change a direction of the first and second wheel support structures, at least one sensor configured to detect a property of the agricultural field or vegetation therein, and a control system configured to control the prime mover and the steering system. The axle is configured to define an adjustable track width between the first wheel and the second wheel. The at least one boom has a plurality of nozzles in fluid communication with the liquid tank. The first and second wheel support structures are configured to change a height of the chassis relative to the first and second wheels.

A method for irrigating an agricultural field includes connecting an external water source to a high-clearance vehicle by a hose and dispensing water from the nozzles of the high-clearance vehicle while the external water source remains connected thereto and while the high-clearance vehicle traverses the agricultural field.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
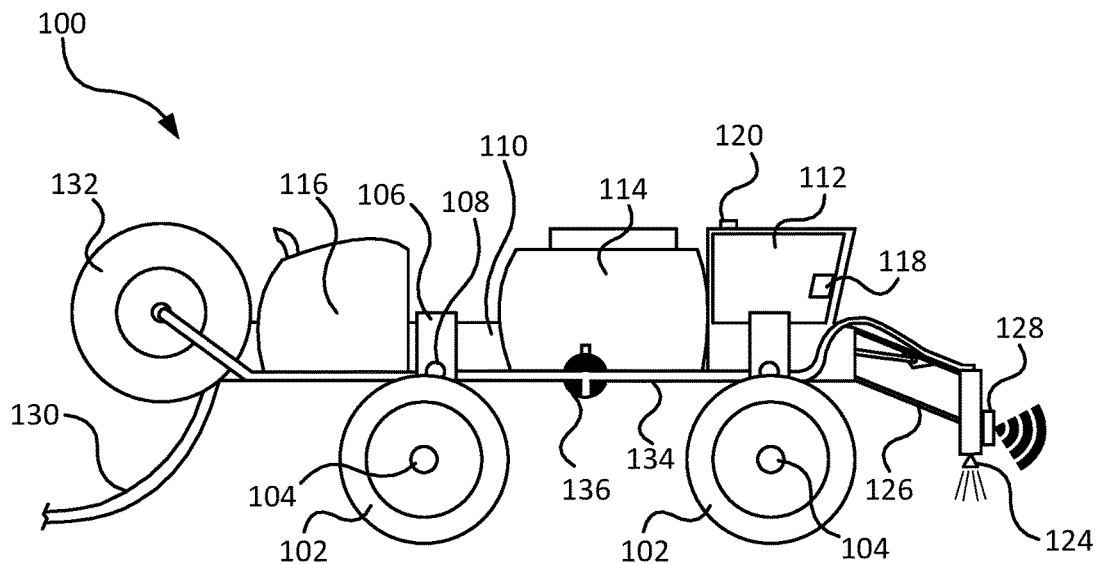
FIG. 1 is a simplified side view illustrating an embodiment of a system for irrigating an agricultural field including a sprayer vehicle carrying a hose reel.

The illustrations presented herein are not actual views of any irrigation system or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "high-clearance vehicle" means a vehicle having a height-adjustment mechanism and configured to operate over growing crops. High-clearance vehicles include sprayers and similar vehicles, such as those disclosed in U.S. Pat. No. 9,296,273, "Machine Suspension and Height Adjustment," granted Mar. 29, 2016.

From reading the following description it should be understood that the terms "longitudinal" and "transverse" are made in relation to the combine harvester's normal direction of travel. In other words, the term "longitudinal" equates to the fore-and-aft direction, whereas the term "transverse" equates to the crosswise direction, or left and right. Furthermore, the terms "axial" and "radial" are made in relation to a rotating body such as a shaft, wherein axial relates to a direction along the rotation axis and radial equates to a direction perpendicular to the rotation axis.

FIG. 1 is a simplified side view of a system including a high-clearance vehicle 100 for irrigating an agricultural field. The vehicle 100 is shown having a plurality of wheels 102 carried by wheel hubs 104 and wheel support structures 106. Though two wheels 102 are shown, it will be understood that the vehicle 100 typically has two additional wheels 102 hidden in the view of FIG. 1. The vehicle 100 may alternatively include other conveyance devices, such as tracks, instead of one or more of the wheels 102. In other embodiments, the vehicle 100 may include any other number of wheels, such as three (e.g., one in front, two in the rear), six, eight, etc. The vehicle 100 includes axle(s) 108 connecting the wheel support structures 106 to a vehicle chassis 110. The chassis 110 may carry various components of the vehicle 100, such as an operator cab 112, a liquid tank 114, and a prime mover 116 (e.g., a diesel or gas engine, an electric motor, etc.). The prime mover 116 is configured to drive rotation of some or all of the wheels 102 to enable the vehicle 100 to travel through an agricultural field.

The axle(s) 108 may be configured to move the wheels 102 inward to and outward from the chassis 110 and define an adjustable track width of the wheels 102. By changing the track width, the wheels 102 of the vehicle 100 may be adapted to travel between rows of crops at various row spacing, without damaging crops.

The wheel support structures 106 may be configured to change the height of the chassis 110 and enable the vehicle 100 to travel over row crops of various heights. Early in the season, when crops are short, the chassis 110 may be low to the ground. Later in the season, as crops grow taller, the chassis 110 may be raised higher from the ground.

FIGS. 13-16 show an exemplary sprayer vehicle 10, which broadly includes a chassis 12, a plurality of wheels 14 or other ground engaging elements supporting the chassis 12 above a ground surface, an application system 16, an operator cabin 18, and an engine compartment 20. A plurality of support assemblies 22 interposed between the wheels 14 and the chassis 12 support the chassis 12 on the wheels 14 and provide suspension, height adjustment and/or steering functions, as discussed in greater detail below.

Certain components of the vehicle 10 have been omitted from the figures for simplicity of illustration and to show certain features of the vehicle 10 that would otherwise be concealed. The engine, for example, has been omitted to illustrate components of the vehicle frame, including portions of the front axle 24. Certain hydraulic lines, such as hydraulic lines running to and from the assemblies 22, are also omitted. The vehicle 10 is illustrated and discussed herein as an exemplary machine.

The vehicle 10 includes a pair of front wheels 14b, 14c and a pair of rear wheels 14a, 14d of the appropriate size and shape to allow the vehicle 10 to travel among row crops with minimal crop disturbance. A used herein, a "wheel" includes an inner, rigid wheel and an outer, flexible tire mounted on the wheel unless otherwise specified.

One or more drive motors 26 may be associated with one or more of the wheels 14 for driving rotation of the wheel or wheels relative to the chassis 12 to thereby propel the vehicle 10 in forward and reverse directions. In the illustrated embodiment, a separate hydraulic motor 26 is drivingly connected to each wheel 14 such that each of the wheels 14 may be driven independently to propel the vehicle 10. Either two or all four of the wheels 14 may be steerable. In some embodiments, the steering functionality of some of the wheels 14 may be selectively enabled and disabled. By way of example, the front wheels 14b, 14c may always be steerable while supplemental steering provided by the rear wheels 14a, 14d may be selectively enabled and disabled. An operator may control the drive motors 26 and steering functions of the wheels 14, including enabling and disabling the steering ability of certain of the wheels 14, from one or more of the user interface elements of the cabin illustrated in FIG. 4.

The vehicle 10 includes mechanisms for adjusting the track width of the wheels to accommodate, for example, different spacing needs for row crops. In the illustrated embodiment, the vehicle 10 includes telescoping axles with an outer axle 28 and an inner axle 30 associated with each wheel 14, wherein the inner axle 30 slidingly engages the outer axle 28 and allows the wheel 14 to shift laterally relative to the chassis 12. A hydraulic piston or similar actuator may drive the inner axle 30 inwardly and outwardly to shift the position of the wheel 14. The inner 30 and outer 28 axles form part of the chassis 12 and, in the illustrated embodiment, the outer axles 28 are rigidly connected to another portion of the chassis, such as one or more frame elements.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The holding tank 32 may have a capacity of between two hundred gallons and two thousand gallons and, more specifically, may have a capacity of 700, 900, 1,100 or 1,300 gallons. The delivery system 34 includes a pair of booms 36 supporting hoses, pumps, and spray nozzles or similar components for dispersing or otherwise applying the contents of the tank to a crop.

The operator cabin 18 or "cab" is supported on the chassis 12 and positioned forward of the application system 16. The cabin 18 presents a control environment 38 including a steering wheel 40, one or more pedals 42, a drive lever 44, one or more electronic instrument panels 46, and a control panel 48 including buttons, switches, levers, gauges, and/or other user interface elements. The various components of the control environment 38 enable the operator to control the functions of the vehicle 10, including driving and operating the application system 16. The various user interface elements are positioned around and proximate a seat 50 for easy access by an operator during operation of the vehicle 10. The control environment 38 may include a touchscreen display. One or both of the electronic instrument panels 46, for example, may be or include a touchscreen, or a display terminal with a touchscreen may be mounted on or near the control panel 48.

As mentioned above, the vehicle 10 includes a support assembly 22 interposed between each of the wheels 14 and the chassis 12. Each support assembly 22 connects to a hub of one of the wheels 14 and to one of the inner axles 30 such that the wheel 14 and the support assembly 22 shift laterally as a single unit relative to the chassis 12 when the inner axle 30 is shifted relative to the outer axle 28 to adjust the vehicle's track width. In some embodiments, the support assemblies 22 include height adjustment components for raising and lowering the chassis 12 of the vehicle between various operating positions. One or more of the support assemblies 22 (or portions thereof) may be selectively pivotable relative to the chassis 12 to thereby steer the vehicle 10.

Each of the support assemblies 22 may include one or more actuators for adjusting a height of the chassis, for steering the associated wheel, or both. In some embodiments, the actuators are hydraulic actuators such as linear or rotary hydraulic actuators. FIG. 15A illustrates an exemplary hydraulic control system 52 for operating hydraulic actuator sections 54 in which a centralized hydraulic pump 56. driven by an internal combustion engine 58 or other power source, communicates pressurized hydraulic fluid to a hydraulic controller 60 that regulates fluid flow between the pump 56 and the hydraulic actuator sections 54 associated with the support assemblies via a plurality of hydraulic transfer lines 62. The hydraulic controller 60 may include, for example, a hydraulic manifold or similar device.

Each of the hydraulic transfer lines 62 communicates hydraulic power between the hydraulic controller 60 and one or more hydraulic actuator sections 54 and, thus, may include one or more hydraulic pressure lines and one or more hydraulic return lines. Each of the hydraulic transfer lines may communicate hydraulic power to more than one actuator, and each of the actuator sections 54 may include a group of actuators associated with each wheel 14 and/or assembly 22. By way of example, a first actuator associated with the actuator section 54 may drive steering of the wheel, a second actuator may drive rotation of the wheel, and a third actuator may adjust a height of the chassis 12. It will be appreciated that the actuator sections 54 are exemplary in nature and that the various hydraulic actuators may not be grouped as described herein.

The system 52 includes a control interface 64 in communication with the hydraulic controller 60. The control interface 64 may be part of a user interface that includes one or more physical or virtual user interface elements 66, such as buttons, switches or dials, and is preferably part of the control environment 38 illustrated in FIG. 16.

It will be appreciated that various different types of technology may be used to actuate the support assemblies 22. Thus, while the various actuators are illustrated and described herein as hydraulic actuators, it will be understood that other types of actuators may be used in place of, or in connection with, the hydraulic actuators without departing from the spirit or scope of the invention. By way of example, electro-mechanical actuators may be used in place of at least some of the hydraulic actuators illustrated and discussed herein.

FIG. 15B illustrates another exemplary control system 68 that is identical to the system 52 but includes a computerized controller 70 with a control module 72 for controlling the hydraulic controller 60. The system 68 may also include a wireless interface element 74 in wireless communication with the controller 60 for allowing a user to remotely control the actuator sections 54. The wireless interface element 74 may be a dedicated device, such as a device similar to a conventional key fob used with cars and other vehicles, or a computing device such as smart phone, tablet computer, or wearable computing device programmed or configured for use with the system 68. The wireless interface element 74 may be configured to communicate with the hydraulic controller 60 and/or the computerized controller 70 via short-range wireless communications, such as Wi-Fi or Bluetooth, or via a communications network such as a cellular network.

The controller 70 may include one or more integrated circuits programmed or configured to control the hydraulic controller 60 to actuate the support assemblies 22 as described herein. By way of example, the controller 70 may include one or more general purpose microprocessors or microcontrollers, programmable logic devices, or application specific integrated circuits. The controller 70 may also include one or more discrete and/or analog circuit components operating in conjunction with the one or more integrated circuits, and may include or have access to one or more memory or storage elements operable to store executable instructions, data, or both.

The control module 72 may be a hardware or software module specifically dedicated to enabling the controller 70 to control the hydraulic controller 60 as described herein.

Another control system 76 illustrated in FIG. 15C is similar to the system 68 but includes additional hydraulic circuit components, such as hydraulic accumulators 78, for use with some embodiments of the invention. In some embodiments, each of the support assemblies 22 may include a single hydraulic actuator that both raises and lowers the chassis 12 and provides suspension functions, as explained below. Such hydraulic systems may require specialized hydraulic circuit components such as the hydraulic accumulators 78.

One of the support assemblies 22 is illustrated in greater detail in

Figure 17:
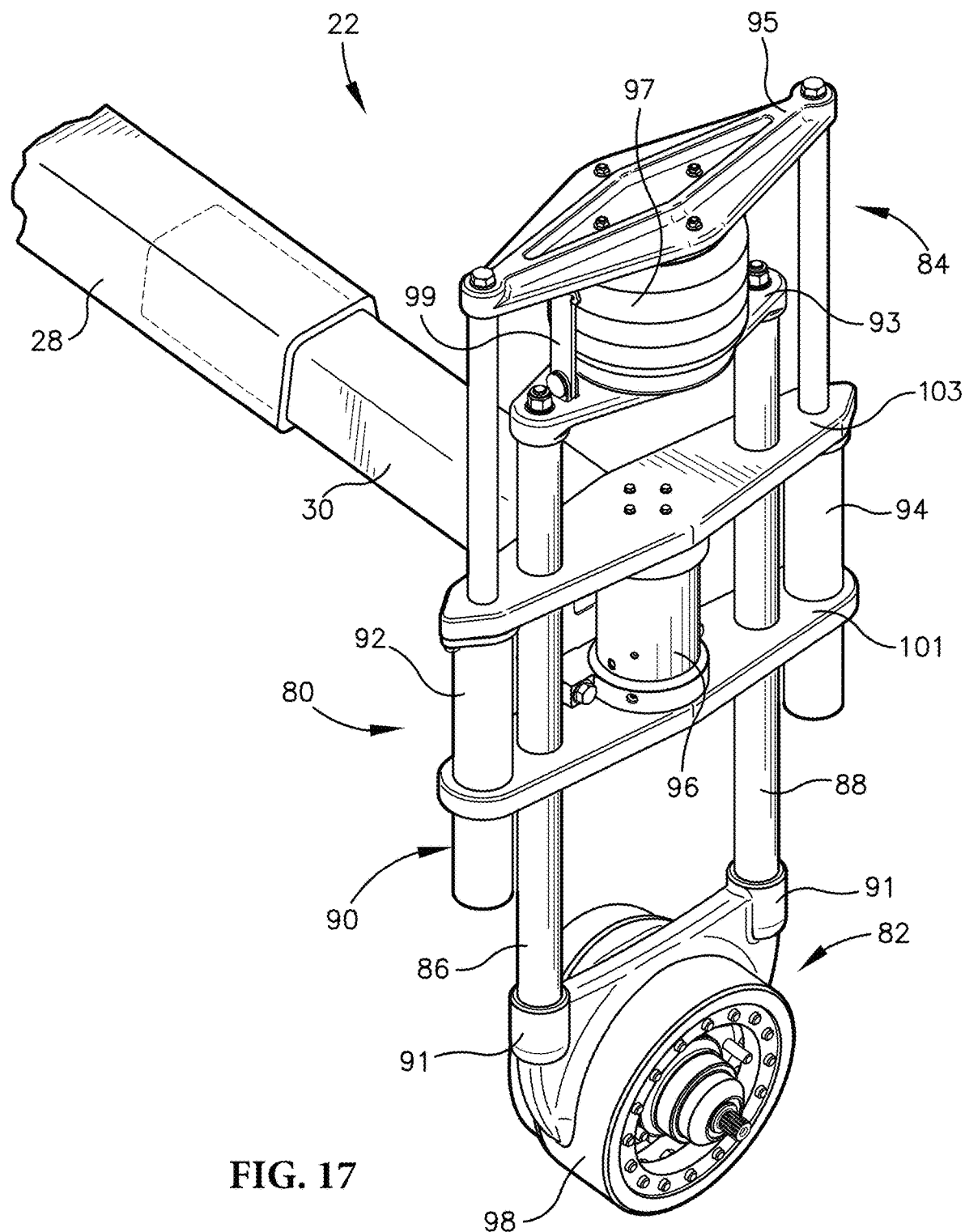
FIG. 17 is a simplified perspective view of one of the wheel support assemblies of the sprayer vehicle shown in FIG. 13.

FIG. 17. The assembly 22 broadly includes a chassis attachment component 80 for attaching to the vehicle chassis 12; a wheel attachment component 82 for attaching to a wheel 14 or other ground engaging element; a suspension component 84 operably interposed between the chassis attachment component 80 and the wheel attachment component 82 for regulating motion transfer between the two attachment components 80, 82; a plurality of strut bars 86, 88 connecting the wheel attachment component 82 to the suspension component 84, and an adjustment mechanism 90 comprising a plurality of adjustment elements 92, 94 for shifting the wheel attachment component 82 between a plurality of operating positions relative to the chassis attachment component 80. The chassis attachment component 80 may include a pivot element 96 for allowing the assembly 22 to pivot relative to the chassis 12 and a pivot actuator may drive the pivoting motion to thereby steer a wheel or other ground engaging element connected to the wheel attachment component 82. In the illustrated embodiment, the pivot element 96 is or includes a rotary actuator.

The wheel attachment component 82 presents a generally cylindrical body 98 and a pair of upwardly-opening receptacles 91 for receiving and connecting to the strut bars 86, 88. The receptacles 91 are positioned on opposite sides of and above the cylindrical body 98. Pivot torque is transferred to the wheel attachment component 82 by the strut bars 86, 88 via the receptacles 91. The wheel attachment component 82 includes a plurality of apertures or other features spaced angularly around the body 98 for connecting to a hub of a wheel, a hydraulic motor and/or a gear reduction hub, a caliper disc brake assembly, a parking brake assembly, and/or similar components.

The suspension component 84 includes a lower suspension member 93, an upper suspension member 95 and a pneumatic spring 97 or similar motion-regulating element positioned between and attached to the upper and lower suspension members. The upper suspension member 95 is connected to a top side or portion of the spring 97 and the lower suspension member 93 is connected to a lower side or portion of the spring 97. Each of the upper 95 and lower 93 suspension members presents an elongated shape and includes a plurality of apertures or other features for attaching to the spring 97. The lower suspension member 93 includes apertures or other features located proximate end portions thereof to facilitate connection to the strut bars 86, 88, and the upper suspension member 95 includes apertures or other features located proximate outer portions thereof to facilitate connection to the adjustment mechanism 90. In the illustrated embodiment, the upper suspension member 95 is longer than the lower suspension member 93 enabling attachment to the adjustment elements 92, 94 that are positioned outboard of the lower suspension member 93.

The pneumatic spring 97 uses trapped or compressed air or other fluid to regulate motion transfer between the chassis attachment component 80 and the wheel attachment component 82. The pneumatic spring 97 may contain air, water, nitrogen, antifreeze or other fluid and may be single, double, or triple convolute. A pair of flexible straps 99 may be positioned on opposite sides of the spring 97 to limit extension of the spring and a bumper may be positioned inside or outside the spring to limit spring compression. Other technologies may be used, including, for example, a coil-type compression spring and a shock-absorbing cylinder and piston assembly.

The suspension components 84 of the assemblies 22 may be the only components of the vehicle 10 configured to regulate motion transfer between the wheels 14 (or other ground engaging element) and the chassis 12. The outer axles 28, for example, may be rigidly connected to portions of the vehicle's frame. Furthermore, the suspension components 84 operate to regulate motion transfer between the wheels 14 and the chassis 12 regardless of the operating position of the assemblies 22. Thus, the suspension components 84 perform essentially the same function regardless of whether the chassis 21 is in a lowered position (e.g., FIG. 45), a raised position (e.g. FIG. 46) or somewhere in between.

The first strut bar 86 and the second strut bar 88 are rigidly connected to the receptacles 91 of the wheel attachment component 82 and are rigidly coupled with the suspension component 84 such that movement of the wheel attachment component 82 relative to the chassis attachment component 80 is communicated through the suspension component 84 via the strut bars 86, 88. More specifically, a first end of the first strut bar 86 is connected to a first receptacle 91 of the wheel attachment component 82 and a first end of the second strut bar 88 is connected to a second receptacle 91 of the wheel attachment component 82. A second end of the first strut bar 86 is connected to a first side of the lower suspension member 93 and a second end of the second strut bar 88 is connected to a second side of the lower suspension member 93. As explained above, the lower suspension member 93 is an elongated, rigid member with outer apertures on opposing ends thereof for connecting to the strut bars 86, 88 and one or more inner apertures between the outer apertures for rigidly attaching to a first side or portion of the spring 97. Thus, the lower suspension member 93 interconnects the spring 97 and the strut bars 86, 88.

The first and second strut bars 86, 88 are parallel or substantially parallel and are separated by a space. The strut bars 86, 88 slidingly engage the chassis attachment component 80 to allow the wheel attachment component 82 to move relative to the chassis attachment component 80 while also transferring pivot torque between the wheel attachment component 82 and the chassis attachment component 80. The strut bars 86, 88 may be separated by a space of between about three inches and twenty inches and, more specifically, may be separated by a space of between about eight inches and about fifteen inches. The length of each of the strut bars 86, 88 may be between about twelve inches and about thirty-six inches and, more specifically, between about twenty inches and about thirty inches. The strut bars 86, 88 may be positioned symmetrically about a center of the wheel attachment component 82 and a center of the chassis attachment component 80.

The chassis attachment component 80 comprises a lower chassis attachment member 101 and an upper chassis attachment member 103 separated by a space. The pivot element 96 is interposed between, and rigidly connected to, the attachment members 101, 103. Each of the lower 101 and upper 103 chassis attachment members includes a pair of spaced through holes in axial alignment for slidingly receiving the strut bars 86, 88. Each of the lower 101 and upper 103 chassis attachment members also includes a pair of apertures or other features positioned outboard of the through holes for engaging the adjustment elements 92, 94.

The chassis attachment component 80 is rigidly but adjustably coupled with the upper suspension member 95 via the adjustment elements 92, 94 such that actuating the adjustment mechanism 90 causes the upper suspension member 95 to shift relative to the chassis attachment component 80, thereby shifting the wheel attachment component 82 relative to the axle 30. The lower suspension member 93 is rigidly connected to the wheel attachment component 82 via the strut bars 86, 88, as explained above, such that motion transfer between the chassis attachment component 80 and the wheel attachment component 82 passes through, and is regulated by, the suspension component 84. Such motion transfer may correspond to up and down movement of the wheels 14 relative to the chassis 12 such that the suspension component 84 may provide a spring or shock absorbing function and may, for example, dampen motion transfer between the wheels 14 and the chassis 12.

The height adjustment mechanism 90, comprising the height adjustment elements 92, 94, is configured to shift the wheel attachment component 82 between a plurality of operating positions relative to the chassis attachment component 80. As used herein, an "operating position" is a selectable position of the wheel attachment component 82 relative to the chassis attachment component 80 in which the distance between the attachment components 80, 82 is rigidly or flexibly fixed. If the distance between the attachment components 80, 82 is flexibly fixed, the relative positions of the attachment components may fluctuate but will return to the same operating position. Stated differently, the average distance between the attachment components 80, 82 will remain the same even though the instantaneous distance may fluctuate above and/or below the average distance. Fluctuations in the relative positions of the attachment components 80, 82 may result, for example, from operation of the suspension component 84, operation of a hydraulic component, or both.

The vehicle 100 also includes a steering system including an operator interface 118 in the operator cab 112. The steering system includes linkages and other associated components to enable one or both sets of wheel support structures 106 to rotate and change the direction of the wheel support structures 106 and the wheels 102. The steering system may be a part of a control system, which also includes a GPS/GNSS receiver 120 to detect a location of the vehicle 100.

The vehicle 100 carries at least one boom 122 having nozzles 124 (one shown in FIG. 1) spaced along a width of the boom 122. Typically the boom 122 is much wider than the track width of the wheels 102, such that the vehicle can apply liquid to a large swatch of field in a single pass. The boom 122 may be a single unitary structure, or may have two or more sections configured to fold (e.g., to enable travel on roadways). For example, the boom 122 may be as described in U.S. Pat. No. 10,375,949, "Electromagnetic Boom Breakaway," issued Aug. 13, 2019. The boom 122 may be connected to the chassis 110 by a parallel linkage 126 or another structure to enable the control system to raise or lower the boom 122.

The boom 122 or the chassis 110 may carry one or more sensors 128 configured to detect a property of the agricultural field (e.g., elevation, slope, obstacles, ground moisture, etc.) or vegetation therein (e.g., crop height, crop density, crop health, etc.). For example, the sensor(s) 128 may include radar, lidar, optical, thermal, chemical, or any other type of sensor. The sensor(s) 128 may communicate with the control system, such that the control system can raise or lower the boom 122 to a height appropriate for the conditions (e.g., above the average crop height).

The vehicle 100 may be connected to an external water source (e.g., a well, a water utility, a stream, etc.) by a hose 130 that may be rolled onto and unrolled from a reel 132. The hose 130 may connect to piping 134 carried by the chassis 110 connecting the liquid tank 114 to the nozzles 124. For example, a valve 136 may be configured to enable flow from the external water source into the liquid tank 114, from the liquid tank 114 to the nozzles 124, or from the external water source and the liquid tank 114 to the nozzles 124. As depicted in FIG. 1, the valve 136 is positioned to enable flow from the water source to the nozzles 124. The piping 134 may include rigid or flexible pipe or hose segments and fittings, or a combination of both rigid and flexible components. Typically, a portion of the piping 134 is flexible to enable the piping 134 to remain connected to the nozzles 124 when the parallel linkage 126 raises or lowers the boom 122.

The nozzles 124 may be individually controllable to dispense liquid based on, for example, information from the sensor(s) 128, a field map, known precipitation data, etc. For example, if the sensors 128 detect that one portion of the field is dryer than another, the nozzles 124 traveling over the dryer area may dispense more water from the external water source than nozzles 124 traveling over the less-dry area. In some embodiments, some of the nozzles 124 may be switched entirely off, such as when traveling over an uncultivated area. Thus, liquid may be dispensed from fewer than all of the nozzles 124 in some conditions.

The reel 132 may be carried by the chassis 110 as the vehicle 100 travels across the agricultural field, unrolling or rolling the hose 130 to keep the hose 130 in fluid connection with the external water source. Thus, the vehicle 100 may dispense water from the external water source over the agricultural field as it travels, without being limited to the amount that can fit in the liquid tank 114. Furthermore, the liquid tank 114 may contain a different material, such as a nutrient, a pesticide, an herbicide, a fungicide, etc. This material may be mixed with the water from the external water source for application to the field. In some embodiments, a nutrient, pesticide, herbicide, fungicide, etc., may be mixed with the water at or near the external water source (e.g., near a well pump).

Figure 2:
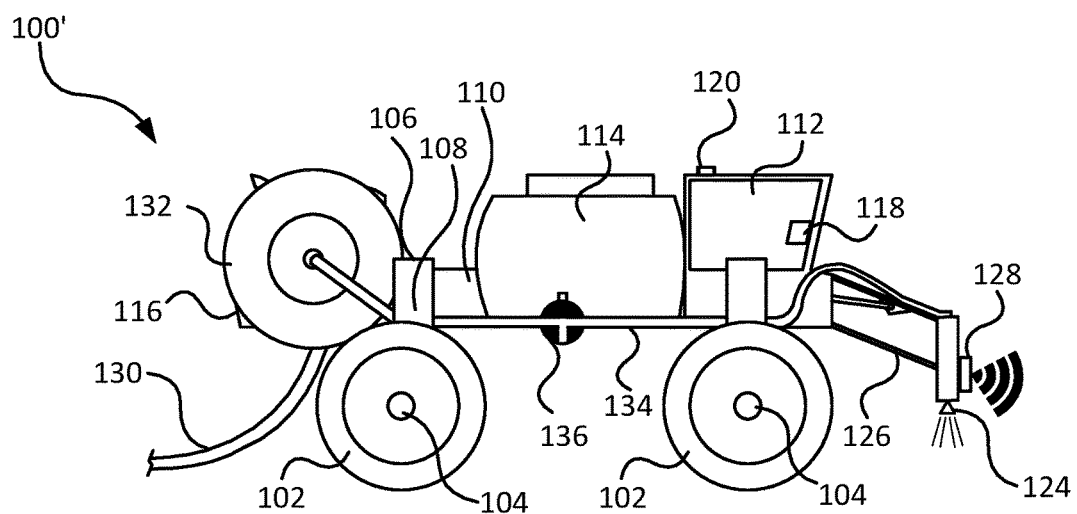
FIG. 2 is a simplified side view illustrating another embodiment of a system for irrigating an agricultural field.
Figure 3:
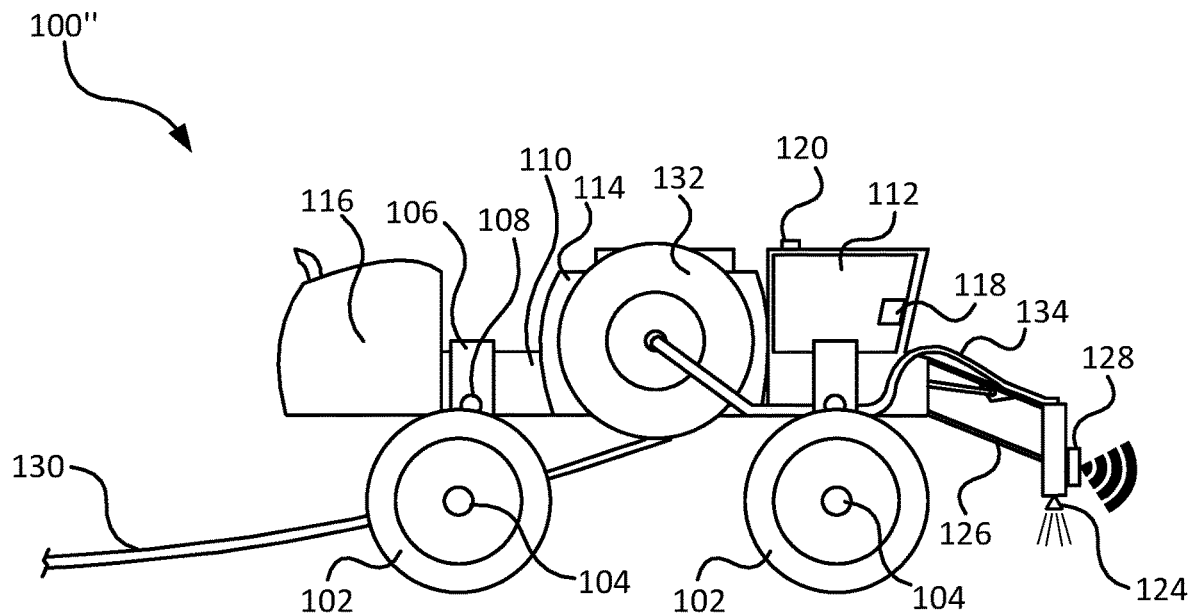
FIG. 3 is a simplified side view illustrating another embodiment of a system for irrigating an agricultural field.

FIGS. 2 and 3 illustrate additional embodiments of vehicles 100', 100", similar to the vehicle 100 shown in FIG. 1. On the vehicle 100' of FIG. 2, the reel 132 is shown adjacent the prime mover 116. On the vehicle 100" of FIG. 3, the reel 132 is shown adjacent the liquid tank 114.

Figure 4:
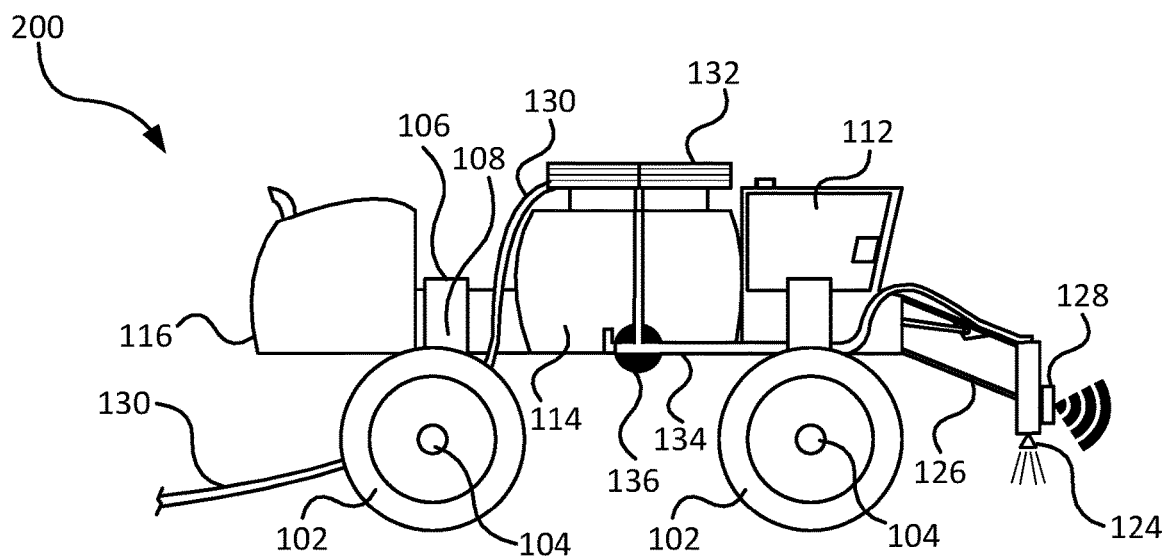
FIG. 4 is a simplified side view illustrating another embodiment of a system for irrigating an agricultural field in which the hose reel is oriented horizontally above a liquid tank.
Figure 5:
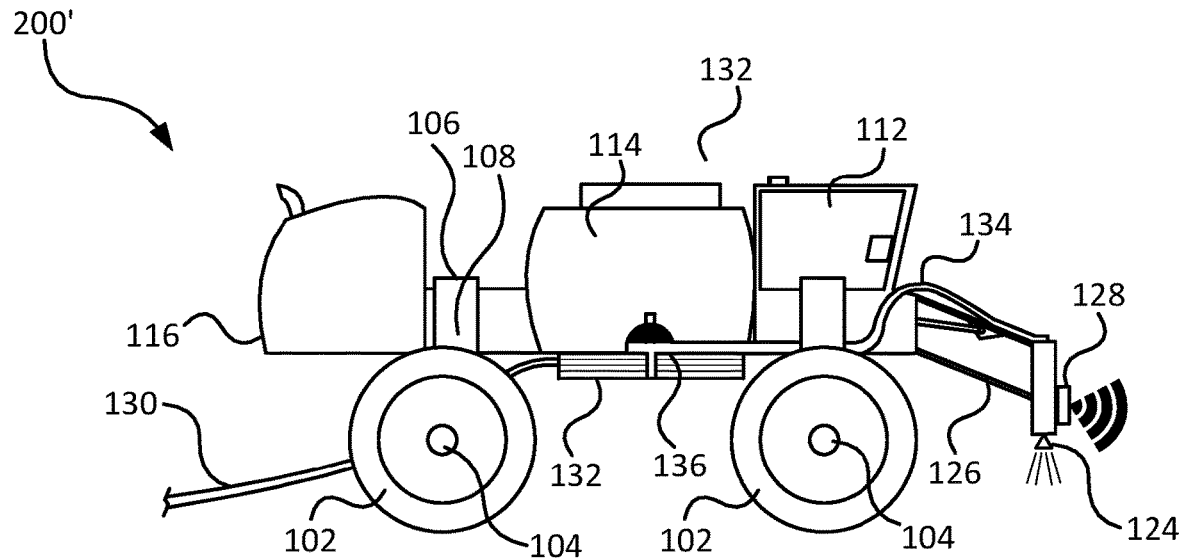
FIG. 5 is a simplified side view illustrating another embodiment of a system for irrigating an agricultural field in which the hose reel is oriented horizontally below a liquid tank.
Figure 6:
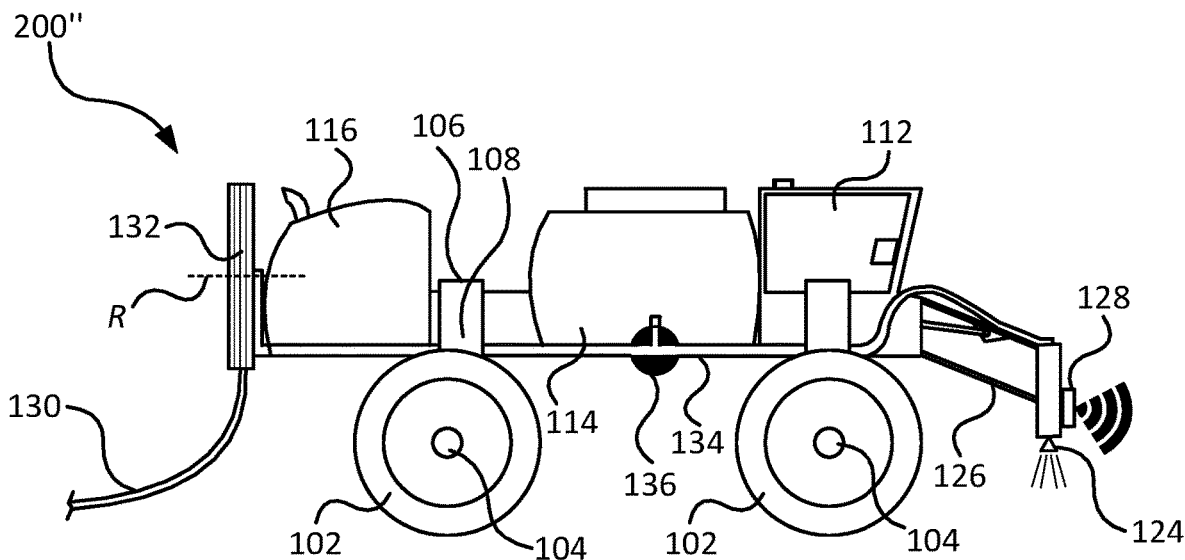
FIG. 6 is a simplified side view illustrating another embodiment of a system for irrigating an agricultural field in which the hose reel is oriented vertically.

FIGS. 4 through 6 illustrate additional embodiments of vehicles 200, 200', 200", similar to the vehicle 100 shown in FIG. 1. On the vehicle 200 of FIG. 4, the reel 132 is shown oriented horizontally above the liquid tank 114, with a vertical axis of rotation (in contrast with the horizontal axis of rotation of the reels 132 in FIGS. 1 through 3). On the vehicle 200' of FIG. 5, the reel 132 is shown below the liquid tank 114. On the vehicle 200" of FIG. 6, the reel 132 is shown behind the prime mover 116 and oriented such that its axis of rotation R is parallel to the direction of travel of the vehicle 200". Placement of the reel 132 may affect loading of the vehicles 100, 100', 100", 200, 200', 200", how the reel 132 is secured to the chassis 110, or plumbing connections to the piping 134. The reel 132 may be secured to the chassis 110 at any other selected location with appropriate support and plumbing connections.

Figure 7:
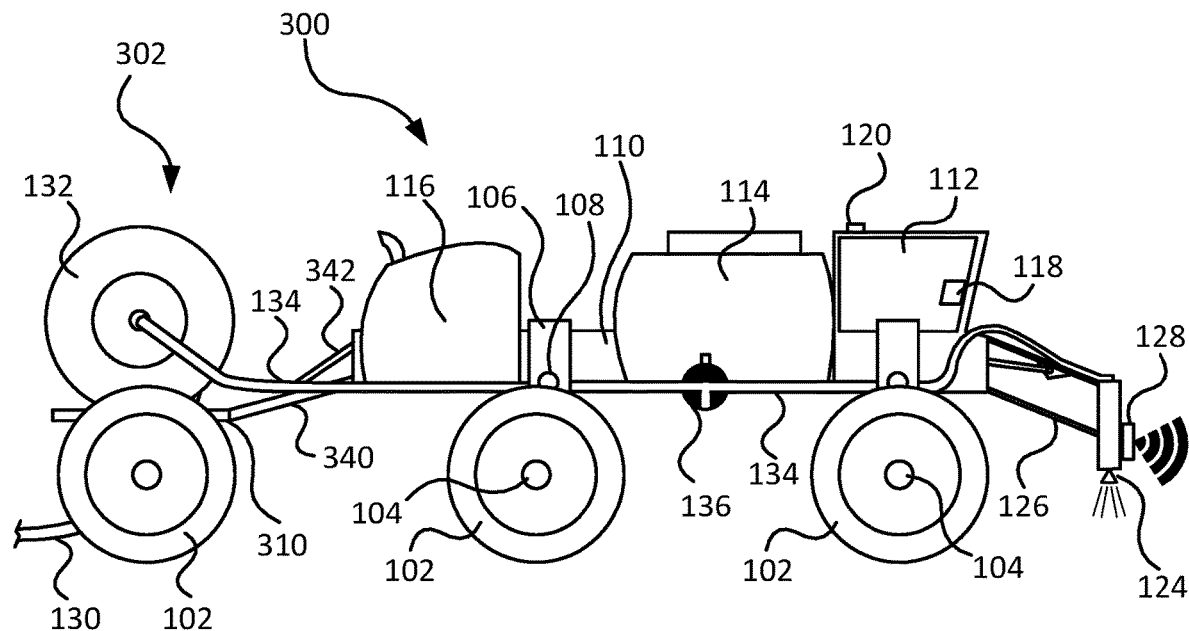
FIG. 7 is a simplified side view illustrating another embodiment of a system for irrigating an agricultural field in which the hose reel is carried by a trailer.

FIG. 7 illustrates another embodiment of a vehicle 300 pulling a trailer 302. The trailer 302 has a chassis 310, wheels 102, and another axle supporting the reel 132 and the portion of the hose 130 on the reel 132. The trailer 302 may be connected to the chassis 110 of the vehicle 300 by a steerable hitch 340, such that the steering system of the vehicle 300 can control movement of the trailer 302. In some embodiments, the wheels 102 of the trailer 302 may be steerable, and may be controlled by the steering system of the vehicle 300.

Figure 8:
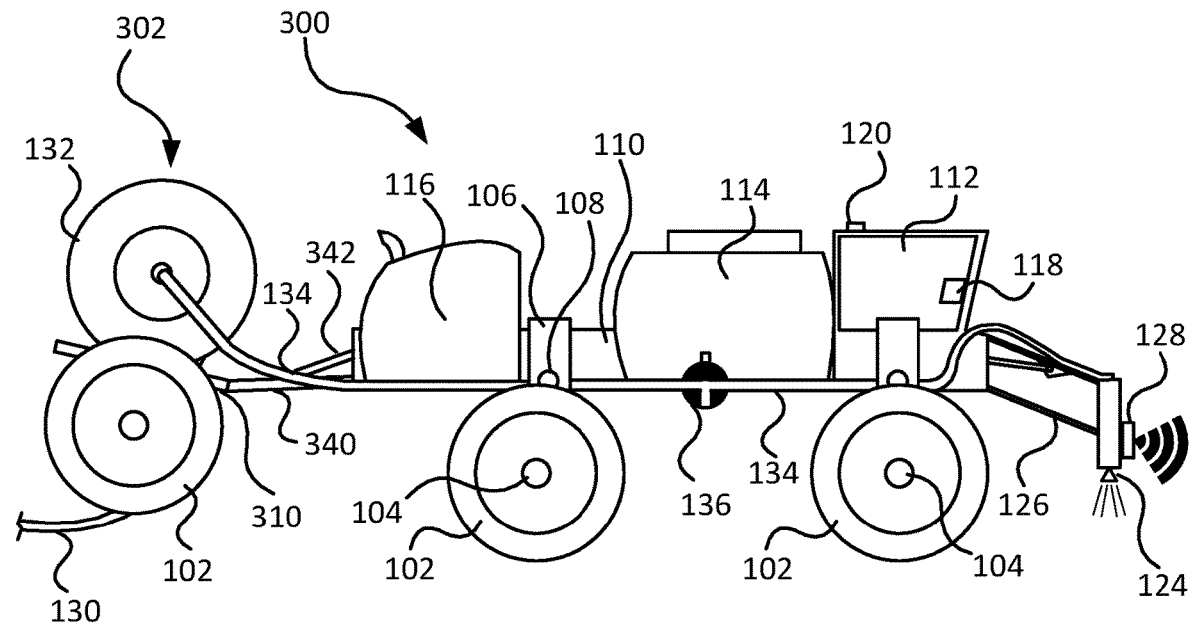
FIG. 8 is a simplified side view illustrating the embodiment of FIG. 7, in which the trailer is lifted off the ground by the towing vehicle.

In some embodiments, and as shown in FIG. 8, the vehicle 300 may include a lifting hitch 342 (or lift element associated with the hitch 340). The lifting hitch 342 may raise the trailer 302 off the ground in certain conditions, such as at the end of crop rows. Raising the trailer 302 off the ground may help to limit or prevent crop damage when the vehicle 300 is turning.

Figure 9:
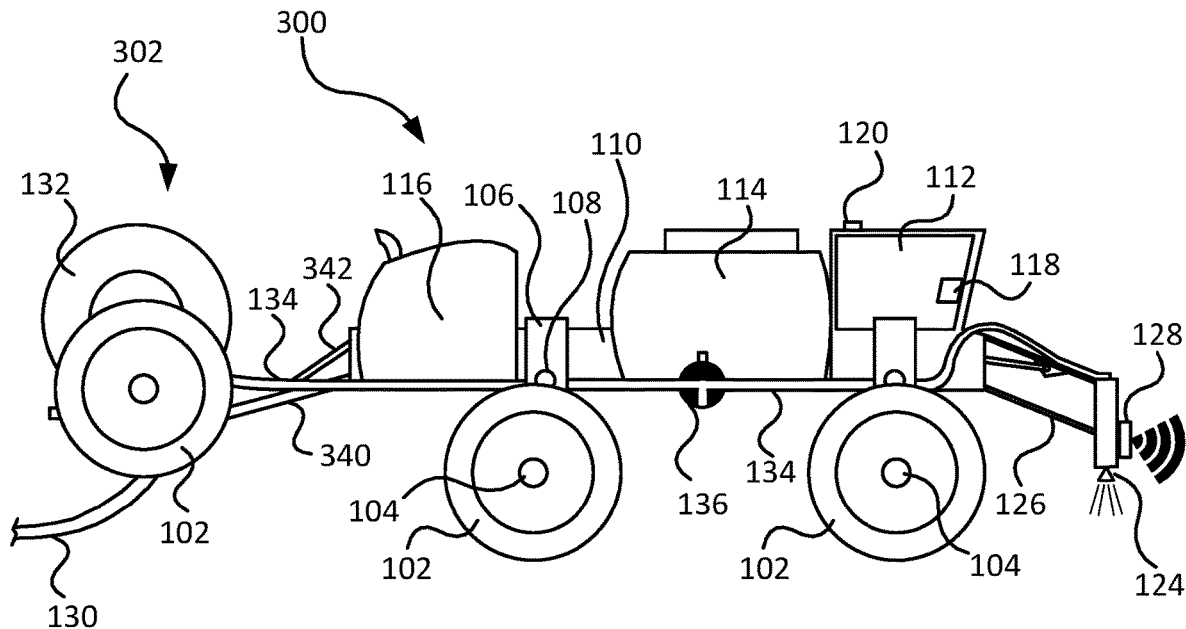
FIG. 9 is a simplified side view illustrating the embodiment of FIG. 7, in which the support wheels of the trailer are lifted off the ground.

In some embodiments, and as shown in FIG. 9, the trailer 302 may be operable to raise its wheels 102 off the ground separate from the lifting hitch 342. For example, the trailer 302 may be equipped with wheel support structures 106 as described above on the vehicle 100. Raising the wheels 102 of the trailer 302 off the ground may help to limit or prevent crop damage when the vehicle 300 is turning.

Figure 10:
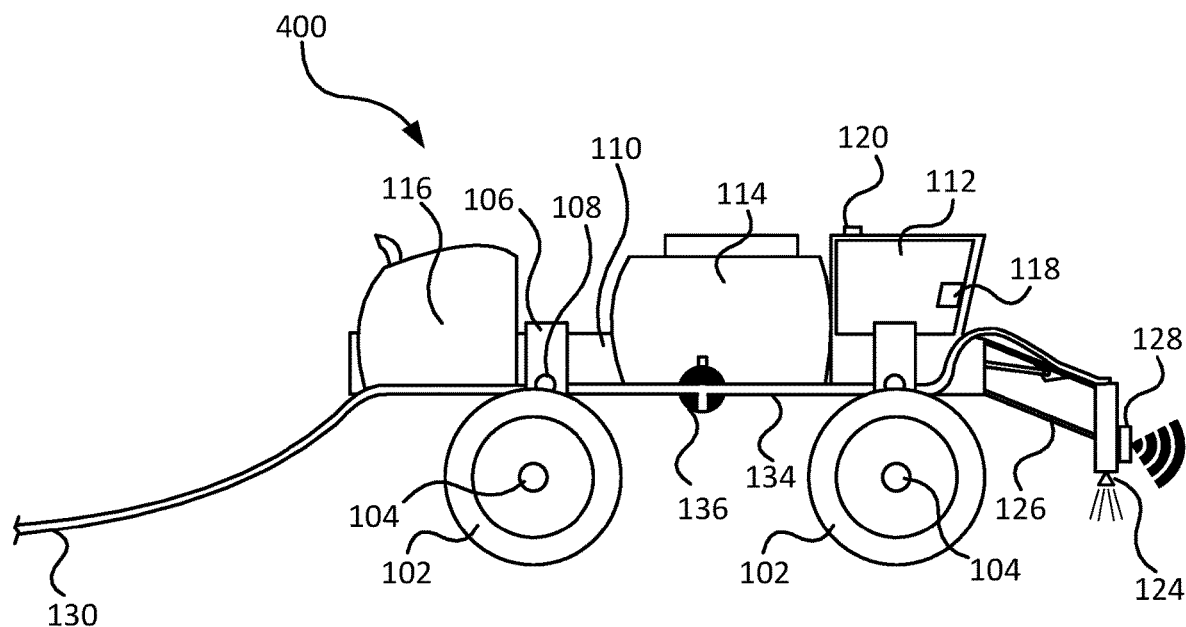
FIG. 10 is a simplified side view illustrating another embodiment of a sprayer vehicle for irrigating an agricultural field.
Figure 11:
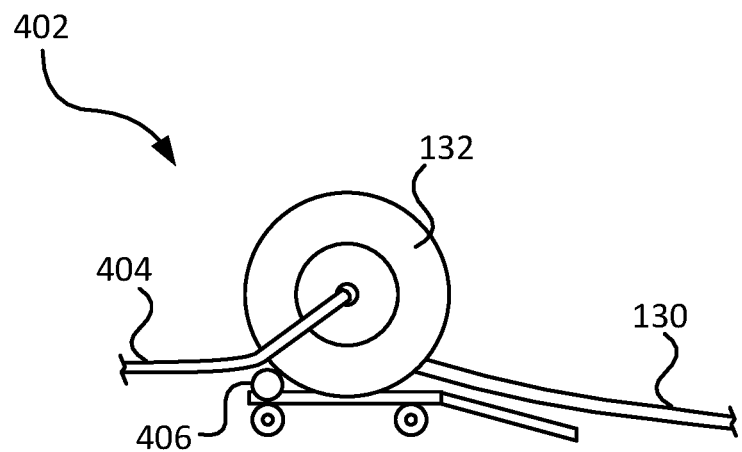
FIG. 11 is a simplified side view illustrating another vehicle that carries a hose reel for use with the sprayer vehicle shown in FIG. 10.

In some embodiments, and as shown in FIG. 10, a vehicle 400 may be connected to a hose 130 drawn across the ground as the vehicle 400 travels in an agricultural field. The hose 130 may be connected at the opposite end to a reel 132 at another location, as shown in FIG. 11. Another hose 404 may connect the hose 130 to a water source. The reel 132 may, in some embodiments, be carried by a vehicle 402 configured to move within the field. For example, the vehicle 402 may be a trailer that can remain parked in the field while the vehicle 400 (FIG. 10) moves through the field, but that can also be moved to another location. In some embodiments, the vehicle 402 may have a prime mover 406, a steering system, sensors, etc. The vehicle 402 may, in some embodiments, be controlled by control signals (wired or wireless) from the vehicle 400. In other embodiments, the vehicle 400 and the vehicle 402 may be controlled by an outside system (e.g., an operator at a remote location, a remote computer system, etc.).

Figure 12:
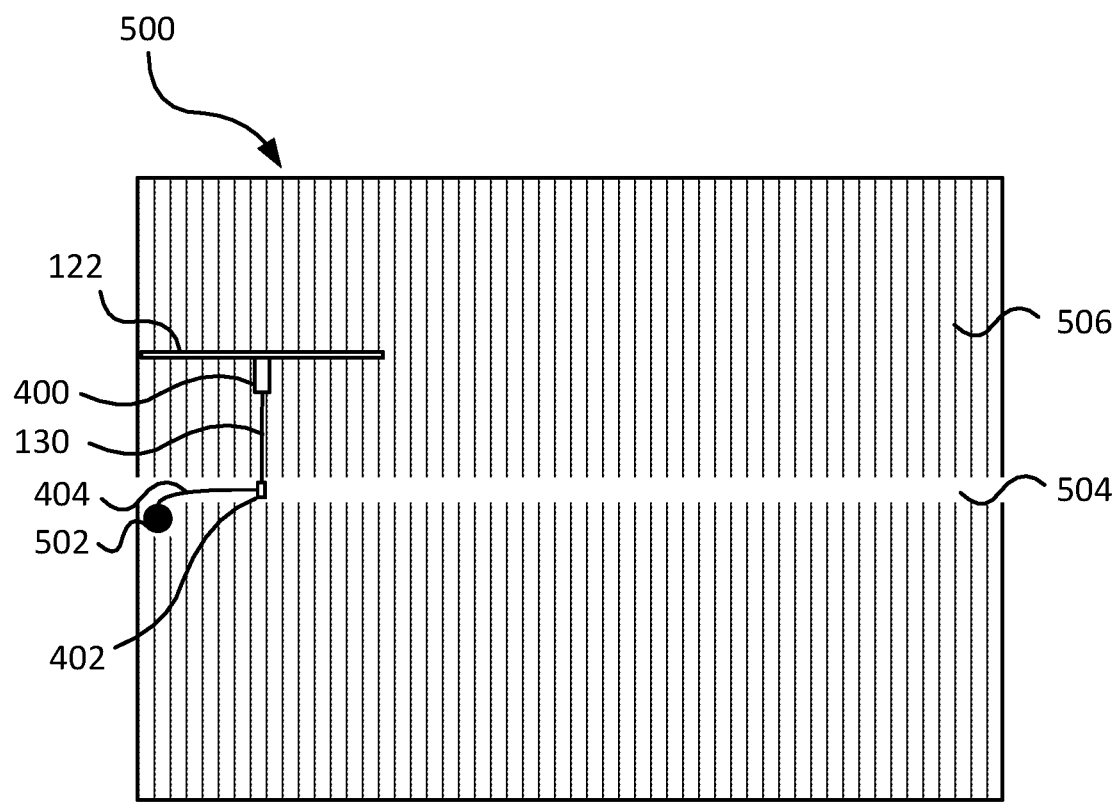
FIG. 12 is a simplified top view of the vehicles in FIGS. 10 and 11 together irrigating an agricultural field.
Figure 13:
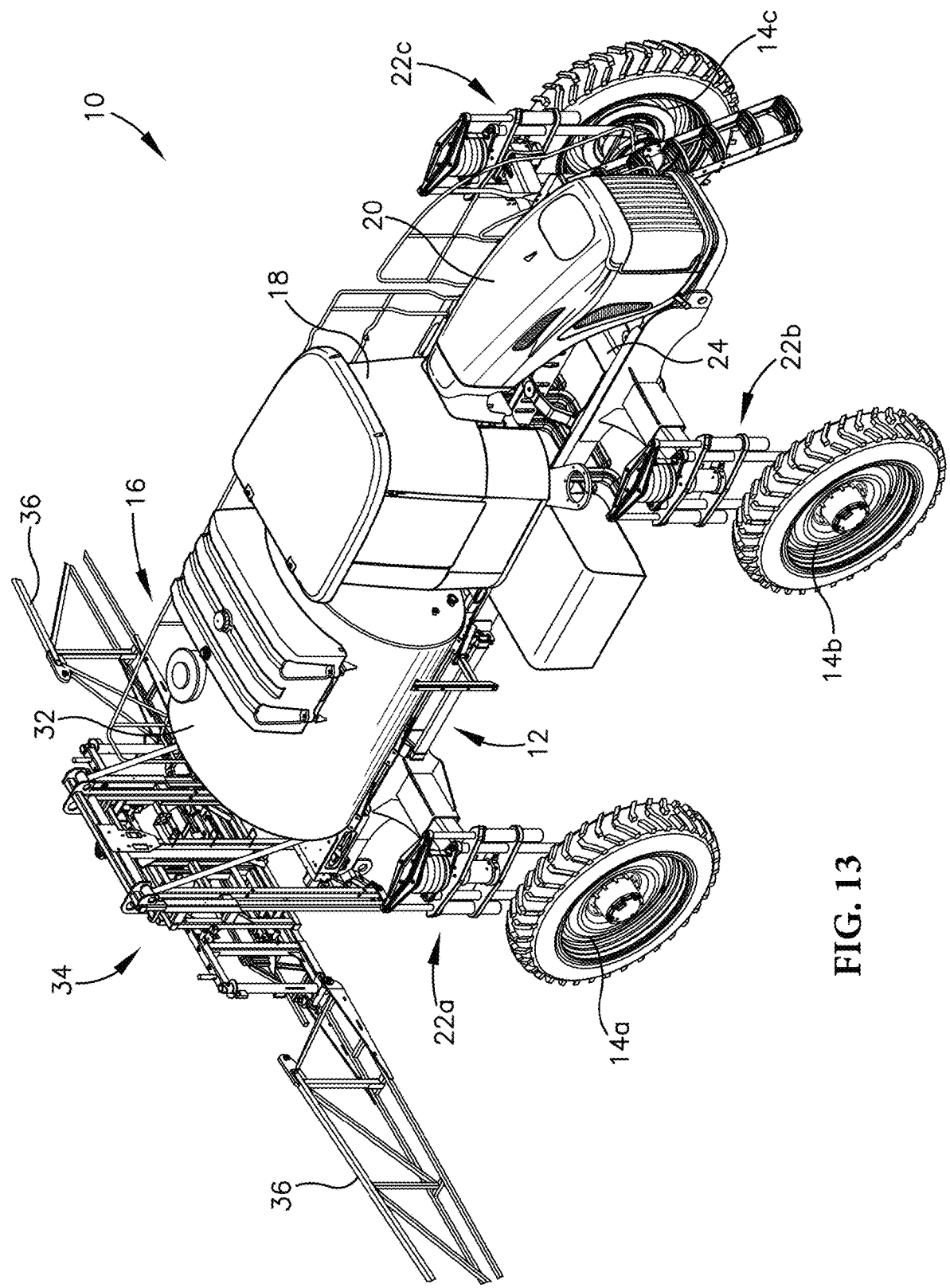
FIG. 13 is a simplified perspective view of sprayer vehicle illustrating height and track-width adjustments.
Figure 14:
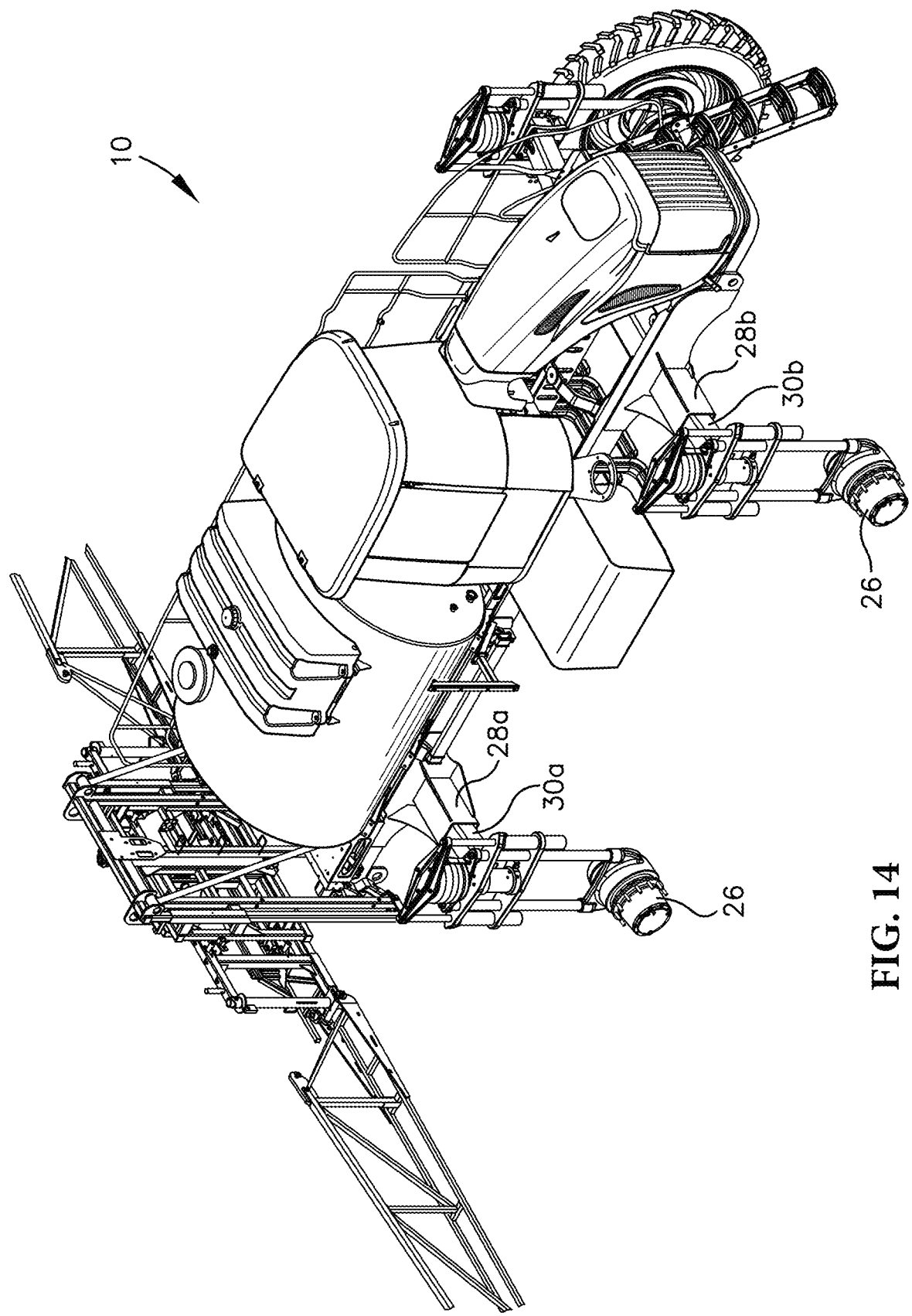
FIG. 14 is a simplified perspective view of the sprayer vehicle of FIG. 13 with two of the wheels omitted to more fully illustrate support assemblies interposed between the wheels and the chassis.
Figure 15:
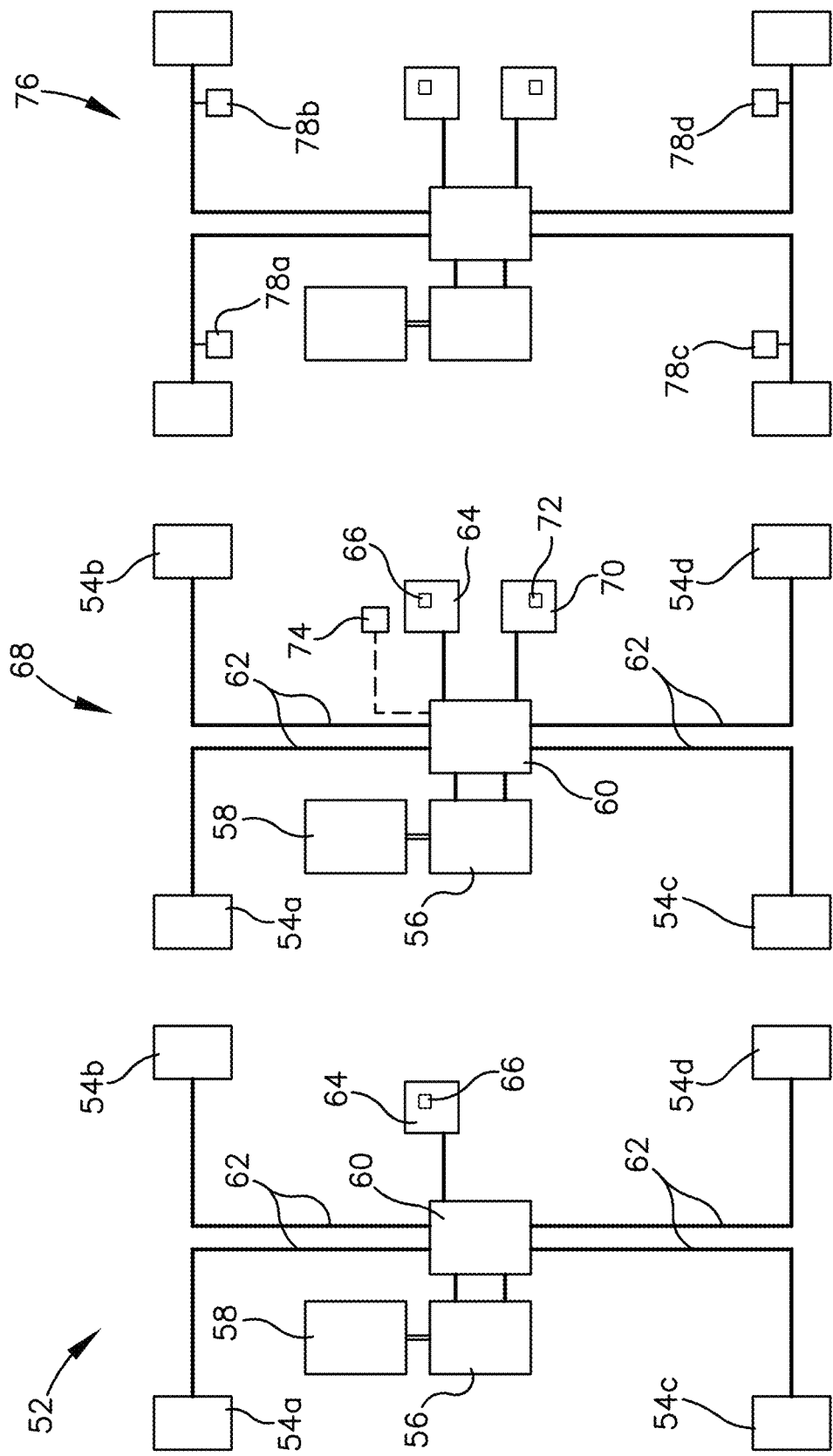
FIGS. 15A-15C are block diagrams of various exemplary embodiments of a control system of the sprayer vehicle of FIG. 13.
Figure 16:
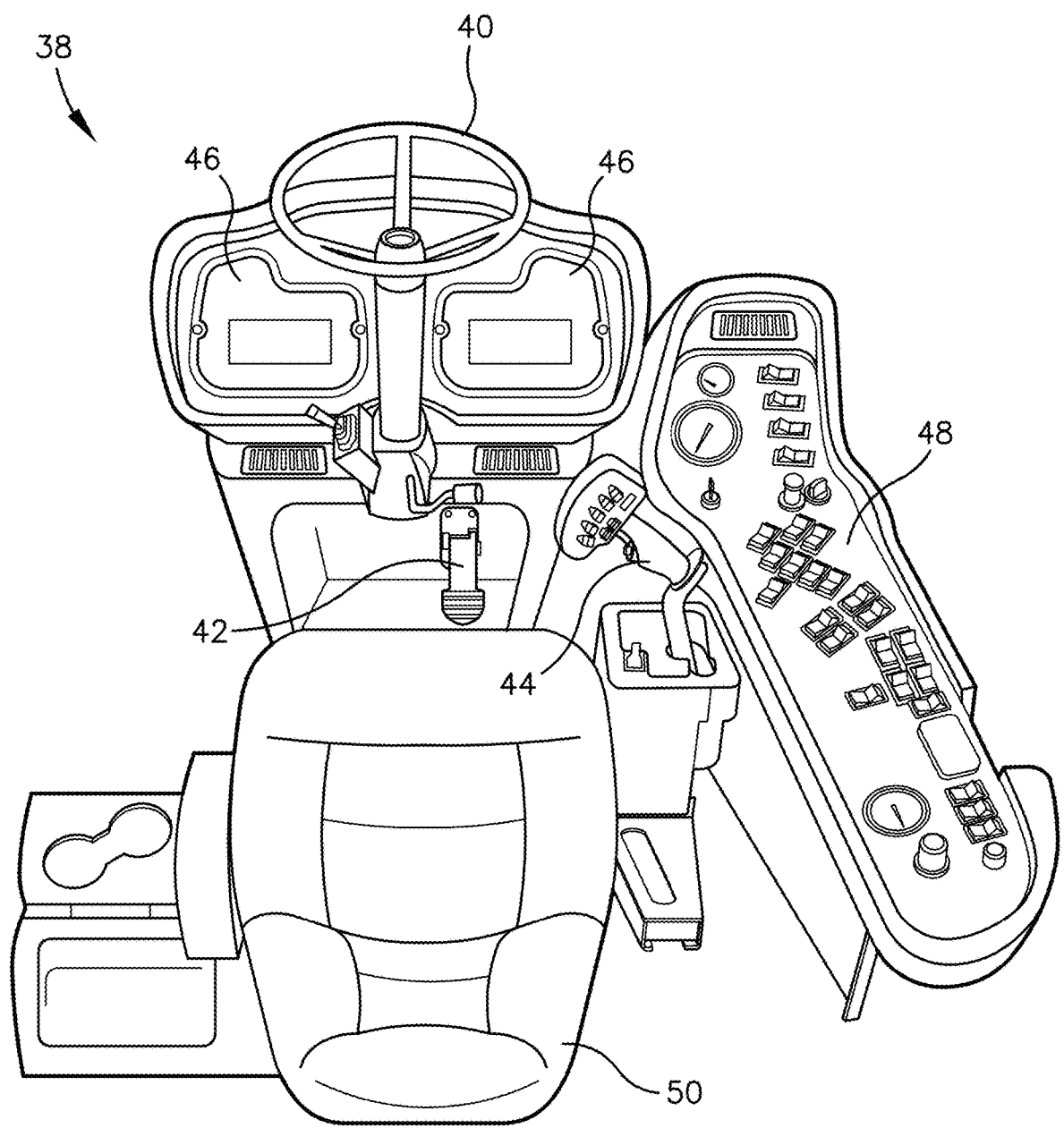
FIG. 16 illustrates certain features of a cabin of the sprayer vehicle of FIG. 13 including one or more user interface elements allowing a user to control certain functions of the sprayer vehicle.

FIG. 12 is a simplified aerial view of an agricultural field 500 in which the vehicles 400, 402 may operate. The field has a water source 502, a road 504, and a cultivated area 506, which may include a row crop such as corn. The vehicle 400 is connected to the vehicle 402 by the hose 130, and the vehicle 402 is connected to the water source 502 by the hose 404. Thus, the water source 502 can supply water to the vehicle 400 traversing the cultivated area 506. The vehicle 402 carrying the reel 132 may remain stationary as the vehicle 400 travels up and down crop rows. The vehicle 402 may move along the road 504 such that the hose 130 between the vehicles 400, 402 can lie on the ground between crop rows.

The vehicle 400 may also be configured for spraying liquid in the cultivated area 506 of the field 500 without connecting the vehicle 400 to the hose 130 (and thus, to the water source 502). When operated without a connection to the water source 502 via the hoses 130, 404, the vehicle 400 may be used for spraying a nutrient, pesticide, herbicide, fungicide, etc. on the crop. Such a vehicle 400 can reasonably move fairly quickly (e.g., 10 mph) and can be used to treat a relatively large area (e.g., 100 acres per day, 200 acres per day, or even more). When used in conjunction with the vehicle 402 connected to the water source 502, the vehicle may travel relatively slowly (e.g., 0.5 mph), and may cover a relatively smaller area (e.g., 5 acres per day, 10 acres per day, etc.). The slower speed enables a much larger volume of water from the water source 502 to be applied to an area of the field 500 than would be applied by the vehicle 400 alone (or by a conventional sprayer alone).

Furthermore, because the ground speed of the vehicle 400 is low, it may be beneficial to operate the vehicle 400 around the clock (i.e., 24 hours per day). Thus, the control system may be configured to operate the vehicle 400, and optionally, the vehicle 402, without an operator present. The control system may use information from the sensors 128 (FIG. 10) to guide the vehicle 400. Though shown and described with reference to the vehicles 400, 402 shown in FIGS. 10 and 11, any of the vehicles shown in FIGS. 1 through 9 may also be operated in the field 500 by unrolling the hose 130 from the reel 132 as the vehicles travel through the field 500.

The control system may also control flow to the nozzles 124. For example, the control system may enable selectively dispensing water from some of the nozzles 124 without dispensing water from other nozzles 124. This may be beneficial when irrigating non-rectangular fields, or fields having certain areas with different irrigation needs.

Typically, the vehicles and systems disclosed herein may be used to provide irrigation to certain fields that cannot be effectively irrigated by conventional means. For example, central pivot irrigation may leave corners of rectangular fields unirrigated. In some climates, lack of irrigation may preclude cost-effective cultivation. Thus, a vehicle as disclosed may be dispatched to portions of a field that lack other sufficient irrigation. Furthermore, if there is a problematic part of a field (e.g., due to different soil type or topography) the vehicles and systems may be used to supplement conventional irrigation in those parts.

Embodiment 1: A method for irrigating an agricultural field, the method comprising connecting an external water source to a high-clearance vehicle by a hose. The high-clearance vehicle comprises a first wheel support structure carrying a first wheel, a second wheel support structure carrying a second wheel, at least one axle connected at a first end to the first wheel support structure and at a second end to the second wheel support structure, a chassis supported by the at least one axle, an operator cab carried by the chassis, a liquid tank carried by the chassis, at least one boom carried by the chassis, a prime mover carried by the chassis and configured to drive rotation of the first wheel and the second wheel, a steering system configured to change a direction of the first and second wheel support structures, at least one sensor configured to detect a property of the agricultural field or vegetation therein, and a control system configured to control the prime mover and the steering system. The first and second wheel support structures are configured to change a height of the chassis relative to the first and second wheels. The at least one boom comprises a plurality of nozzles in fluid communication with the liquid tank. The at least one axle is configured to define an adjustable track width between the first wheel and the second wheel. The method also comprises dispensing water from the nozzles of the high-clearance vehicle while the external water source remains connected thereto and while the high-clearance vehicle traverses the agricultural field.

Embodiment 2: The method of Embodiment 1, further comprising detecting the property of the agricultural field or vegetation therein with the at least one sensor and changing the height of the chassis relative to the first and second wheels responsive at least in part to the detected property.

Embodiment 3: The method of Embodiment 1 or Embodiment 2, further comprising detecting a spacing between row crops with the at least one sensor and changing a length of the at least one axle to change the adjustable track width based on the detected spacing.

Embodiment 4: The method of any one of Embodiment 1 through Embodiment 3, further comprising unrolling the hose from a reel as the high-clearance vehicle dispenses the water.

Embodiment 5: The method of Embodiment 4, further comprising transporting at least a portion of the hose on the reel while unrolling the hose.

Embodiment 6: The method of Embodiment 5, further comprising transporting the reel and at least a portion of the hose on the chassis.

Embodiment 7: The method of Embodiment 5, further comprising supporting the reel and at least a portion of the hose on another axle leading or trailing the at least one axle supporting the chassis.

Embodiment 8: The method of Embodiment 7, further comprising steering the another axle with a steerable hitch.

Embodiment 9: The method of Embodiment 7, further comprising raising the another axle above a surface of the agricultural field.

Embodiment 10: The method of Embodiment 4, wherein unrolling the hose comprises unrolling the hose from a stationary reel while the high-clearance vehicle traverses the agricultural field.

Embodiment 11: The method of Embodiment 4, further comprising moving the reel in a first direction and wherein dispensing water from the nozzles of the high-clearance vehicle while the external water source remains connected thereto and while the high-clearance vehicle traverses the agricultural field comprises causing the high-clearance vehicle to traverse the agricultural field in a second direction perpendicular to the first direction.

Embodiment 12: The method of Embodiment 4, further comprising rotating the reel in a fixed position to unroll the hose while the high-clearance vehicle traverses the agricultural field and dispenses water.

Embodiment 13: The method of any one of Embodiment 1 through Embodiment 12, further comprising mixing a material with the water, the material selected from the group consisting of a nutrient, a pesticide, a fungicide, and an herbicide.

Embodiment 14: The method of any one of Embodiment 1 through Embodiment 13, wherein dispensing water from the nozzles of the high-clearance vehicle comprises selectively dispensing water from fewer than all the nozzles of the high-clearance vehicle.

Embodiment 15: A system for irrigating an agricultural field, comprising a high-clearance vehicle and a hose configured to connect an external water source to the high-clearance vehicle while the high-clearance vehicle traverses the agricultural field.

The high-clearance vehicle comprises a first wheel support structure carrying a first wheel, a second wheel support structure carrying a second wheel, at least one axle connected at a first end to the first wheel support structure and at a second end to the second wheel support structure, a chassis supported by the at least one axle, an operator cab carried by the chassis, a liquid tank carried by the chassis, at least one boom carried by the chassis, a prime mover carried by the chassis and configured to drive rotation of the first wheel and the second wheel, a steering system configured to change a direction of the first and second wheel support structures, at least one sensor configured to detect a property of the agricultural field or vegetation therein, and a control system configured to control the prime mover and the steering system. The at least one axle is configured to define an adjustable track width between the first wheel and the second wheel. The at least one boom comprises a plurality of nozzles in fluid communication with the liquid tank. The first and second wheel support structures are configured to change a height of the chassis relative to the first and second wheels.

Embodiment 16: The system of Embodiment 15, further comprising a reel configured to unroll the hose as the high-clearance vehicle traverses the agricultural field.

Embodiment 17: The system of Embodiment 16, wherein the chassis supports the reel.

Embodiment 18: The system of Embodiment 16, further comprising another axle supporting the reel.

Embodiment 19: The system of Embodiment 18, wherein the another axle is configured to lead or trail the at least one axle supporting the chassis.

Embodiment 20: The system of Embodiment 18, further comprising another prime mover configured to move the reel independently of the high-clearance vehicle.

Embodiment 21: The system of Embodiment 20, further comprising another control system configured to control the another prime mover to move the reel, wherein the another control system is configured to communicate with the control system of the high-clearance vehicle.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A system for irrigating an agricultural field, comprising:
a high-clearance vehicle, the high-clearance vehicle comprising:
   a chassis supported by at least extendible one axle;
   a first wheel carried by a first height-adjustable wheel support structure, the first wheel support structure comprising a first hub, at least one strut bar connecting the first hub to the at least one axle, and an actuator configured to change a height of the chassis relative to the first wheel;
   a second wheel carried by a second height-adjustable wheel support structure, the second wheel support structure comprising a second hub, at least one strut bar connecting the second hub to the at least one axle, and an actuator configured to change a height of the chassis relative to the second wheel;
   wherein the at least one axle is configured to define an adjustable track width between the first wheel and the second wheel;
   an operator cab carried by the chassis;
   a liquid tank carried by the chassis;
   at least one boom carried by the chassis, the at least one boom comprising a plurality of nozzles in fluid communication with the liquid tank;
   a prime mover carried by the chassis and configured to drive rotation of the first wheel and the second wheel;
   a steering system comprising a steering wheel coupled to the first and second wheel support structures, the steering system configured to change a direction of the first and second wheel support structures;
   at least one sensor configured to detect a property of the agricultural field or vegetation therein; and
   wherein the first and second wheel support structures are configured to change a height of the chassis relative to the first and second wheels; and
a hose configured to connect an external water source to the high-clearance vehicle while the high-clearance vehicle traverses the agricultural field.

2. The system of claim 1, further comprising a reel configured to unroll the hose as the high-clearance vehicle traverses the agricultural field.

3. The system of claim 2, wherein the chassis supports the reel.

4. The system of claim 2, further comprising another axle supporting the reel.

5. The system of claim 4, wherein the another axle is configured to lead or trail the at least one axle supporting the chassis.

6. The system of claim 4, further comprising another prime mover configured to move the reel independently of the high-clearance vehicle.

7. The system of claim 6, further comprising another control system configured to control the another prime mover to move the reel, wherein the another control system is configured to communicate with the control system of the high-clearance vehicle.

8. A method for irrigating an agricultural field, using the system of claim 1, the method comprising:
   connecting an external water source to a high-clearance vehicle by the hose; and
   dispensing water from the nozzles of the high-clearance vehicle while the external water source remains connected thereto and while the high-clearance vehicle traverses the agricultural field.

9. The method of claim 8, further comprising detecting the property of the agricultural field or vegetation therein with the at least one sensor and changing the height of the chassis relative to the first and second wheels responsive at least in part to the detected property.

10. The method of claim 8, further comprising detecting a spacing between row crops with the at least one sensor and changing a length of the at least one axle to change the adjustable track width based on the detected spacing.

11. The method of claim 8, further comprising unrolling the hose from a reel as the high-clearance vehicle dispenses the water.

12. The method of claim 11, further comprising transporting at least a portion of the hose on the reel while unrolling the hose.

13. The method of claim 12, further comprising transporting the reel and at least a portion of the hose on the chassis.

14. The method of claim 12, further comprising supporting the reel and at least a portion of the hose on another axle leading or trailing the at least one axle supporting the chassis.

15. The method of claim 14, further comprising steering the another axle with a steerable hitch.

16. The method of claim 14, further comprising raising the another axle above a surface of the agricultural field.

17. The method of claim 11, wherein unrolling the hose comprises unrolling the hose from a stationary reel while the high-clearance vehicle traverses the agricultural field.

18. The method of claim 11, further comprising moving the reel in a first direction and wherein dispensing water from the nozzles of the high-clearance vehicle while the external water source remains connected thereto and while the high-clearance vehicle traverses the agricultural field comprises causing the high-clearance vehicle to traverse the agricultural field in a second direction perpendicular to the first direction.

19. The method of claim 11, further comprising rotating the reel in a fixed position to unroll the hose while the high-clearance vehicle traverses the agricultural field and dispenses water.

20. The method of claim 8, further comprising mixing a material with the water, the material selected from the group consisting of a nutrient, a pesticide, a fungicide, and an herbicide.

* * * * *